US008132760B2

(12) United States Patent
Haas

(10) Patent No.: US 8,132,760 B2
(45) Date of Patent: Mar. 13, 2012

(54) PARACHUTING AID METHOD AND DEVICE

(75) Inventor: Philippe Haas, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 1116 days.

(21) Appl. No.: 10/998,048

(22) Filed: Nov. 29, 2004

(65) Prior Publication Data

US 2006/0054744 A1 Mar. 16, 2006

(30) Foreign Application Priority Data

Dec. 4, 2003 (FR) ...................................... 03 14240

(51) Int. Cl.
*B64D 1/08* (2006.01)
(52) U.S. Cl. .................................................... 244/137.1
(58) Field of Classification Search ................ 244/137.1, 244/137.3, 137.4, 138 R
See application file for complete search history.

(56) References Cited

U.S. PATENT DOCUMENTS

| | | | | | |
|---|---|---|---|---|---|
| 3,113,751 | A | * | 12/1963 | Cotton ........................ | 244/137.3 |
| 3,401,905 | A | * | 9/1968 | Rohrlick ..................... | 244/137.3 |
| 4,121,246 | A | * | 10/1978 | Fadden et al. ................. | 348/117 |
| 4,194,708 | A | * | 3/1980 | Tracy et al. ..................... | 244/15 |
| 4,416,436 | A | * | 11/1983 | Wilson, Jr. ................. | 244/137.1 |
| 4,692,869 | A | * | 9/1987 | King et al. ..................... | 701/206 |
| 6,847,866 | B2 | * | 1/2005 | Gaier ................................ | 701/4 |
| 7,003,383 | B2 | * | 2/2006 | Rumbo et al. .................... | 701/3 |
| 2004/0153218 | A1 | * | 8/2004 | Lohmiller .......................... | 701/3 |
| 2005/0127242 | A1 | * | 6/2005 | Rivers, Jr. ................... | 244/137.1 |

FOREIGN PATENT DOCUMENTS

| DE | 43 39 251 | 4/1995 |
|---|---|---|
| WO | 03018401 | 3/2003 |

OTHER PUBLICATIONS

"Airborne Assault of 6$^{th}$ Airborne Division" Jun. 5, 2003 http://web.archive.org/web/20030605211859/http://www.warchronicle.com/dday/pegasus/pegasus.htm.*
"A Reconfigurable Integrated Navigation and Flight Management System for Military Transport Aircraft" Taylor, L. O. and K. W. McElreath, IEEE 1989.*
Preliminary Search Report dated May 17, 2004 with English translation.

* cited by examiner

*Primary Examiner* — Joshua J Michener
*Assistant Examiner* — Joseph W Sanderson
(74) *Attorney, Agent, or Firm* — Dickinson Wright PLLC

(57) ABSTRACT

A parachuting method may include: (1) determining a release point where parachute items must be released from an aircraft, (2) determining a first end point that is located on a straight reference line downstream of the release point where the release of parachute items must stop, (3) determining a second end point that is located on the straight reference line downstream of the first end point where parachuting is ended, (4) performing a first parachuting sequence by guiding the aircraft along the straight reference line and releasing some of the items to be parachuted between the release point and the first end point, (5) determining a flight circuit for the aircraft to return from the second end point to follow the straight reference line until it reaches the second end point, and (6) performing additional parachuting sequences.

6 Claims, 2 Drawing Sheets

PARACHUTING AID METHOD AND DEVICE

The present invention relates to a parachuting aid method and device.

BACKGROUND OF THE RELATED ART

It applies to parachuting from an aircraft, in particular from a military transport aircraft, of items, in particular of equipment or troops, which must be parachuted onto a predetermined reception area on the ground. In order to carry out such a parachuting there is generally determined:
- a release point where the items to be parachuted must be released from the said aircraft, the said release point depending on a predetermined reception point located on the said reception area on the ground; and
- an alignment point which forms, with the said release point, a straight reference line which is parallel with a center line provided on the reception area, the said alignment point being located at a predetermined distance from the said release point, upstream of the latter in the direction of flight of the aircraft.

In order to implement the parachuting:
the aircraft is guided along the said straight reference line; and
during this guidance, the release of the said items to be parachuted is carried out between the said release point and a downstream end of parachuting point.

Depending on the quantity of equipment to be parachuted or on the number of persons to be parachuted, the size of the said reception area can be inadequate for all of the foreseen parachuting to be able to be carried out in a single pass of the aircraft over the said reception area. In such a case, after a first pass, the pilot must return the aircraft to the said release point, by means of manual piloting, in order to carry out at least one additional pass for the purpose of additional parachuting. Such piloting is generally not simple to carry out and, furthermore, requires all the attention of the pilot.

SUMMARY OF THE INVENTION

The purpose of the present invention is to overcome this disadvantage. It relates to a method of parachuting items (troops, equipment, etc.) to be parachuted from an aircraft onto a reception area on the ground, making it possible to carry out a plurality of parachutings automatically.

For this purpose and according to the invention, the said method, according to which:
there is determined:
- a release point where the items to be parachuted must be released from the said aircraft, the said release point depending on a *predetermined reception point located on the said reception area on the ground;
- an alignment point which forms, with the said release point, a straight reference line which is parallel with a center line provided on the reception area, the said alignment point being located at a predetermined distance from the said release point, upstream of the latter in the direction of flight of the aircraft;
- a first end point which is located on the said straight reference line downstream of the said release point, at a point where the release of the items to be parachuted must stop in order to prevent them from overshooting the said reception area; and
- a second end point which is located on the said straight reference line downstream of the said first end point, at a point where a parachuting sequence is ended; and in order to carry out a first parachuting sequence:
the aircraft is guided along the said straight reference line; and
during this guidance, the release of at least some of the said items to be parachuted is carried out, and this is done uniquely between the said release point and the said first end point, is noteworthy, according to the invention, in that:
there is furthermore determined a flight circuit making it possible for the aircraft to return, from the said second end point, to the said alignment point, and then to follow the said straight reference line until it reaches the said second end point; and
in order to carry out a number n of additional parachuting sequences, n being an integer greater than or equal to 1:
the aircraft is guided automatically in such a way that it completes the said flight circuit n times; and
during this guidance, each time the aircraft passes between the said release point and the said first end point along the said straight reference line, the release of items to be parachuted is carried out.

In this way, due to the invention, it is possible to carry out automatically as many parachuting sequences as necessary.

Advantageously, in order to determine the said flight circuit, there is determined:
a first auxiliary point which is located in a horizontal plane containing the said straight reference line, at a particular distance from the said second end point, the segment of straight line formed by the said first auxiliary point and the said second end point being perpendicular to the said straight reference line;
a second auxiliary point which is located in the said horizontal plane, the segment of straight line formed by the said first and second auxiliary points being parallel with the said straight reference line and perpendicular to the segment of straight line formed by the said second auxiliary point and the said alignment point; and
the said flight circuit as a circuit that is able to be followed by the aircraft in the said horizontal plane and which passes successively through the said second end point, the said first auxiliary point, the said second auxiliary point and the said alignment point, before rejoining the said second end point again by following the said straight reference line.

Preferably, the said straight reference line and the aforementioned points which are located on it are updated each time according to the characteristics of the next parachuting.

Advantageously, the said first auxiliary point is determined with the help of the following modifiable parameters: the said particular distance and the direction of turn of the aircraft after the said second end point.

In a first embodiment, there is determined a number p of parachuting sequences before the flight of the aircraft, p being an integer greater than or equal to 1, and during the flight the aircraft is automatically controlled in order to carry out the said first parachuting sequence and, if applicable, a number p−1 of additional parachuting sequences.

In a second embodiment, during the flight, an additional parachuting sequence is commanded before arriving at the said second end point.

The present invention also relates to a parachuting aid device for an aircraft, in order to assist in parachuting items from the said aircraft onto a reception area on the ground.

According to the invention, the said device is noteworthy in that it comprises:
- first means making it possible for an operator to enter parameters;
- second means for automatically determining, with the help of the said parameters, a flight circuit intended for a parachuting sequence;
- third means for automatically making the said aircraft follow the said flight circuit at least once, for the purpose of a parachuting sequence; and
- fourth means for indicating the possibility of releasing items to be parachuted, when the aircraft is on a straight reference line of the said flight circuit, between two predetermined points.

In a particular embodiment, the said third means comprise:
- fifth means for determining guidance commands making it possible for the said aircraft to follow the said flight circuit; and
- sixth means for applying the said guidance commands to guidance means of the said aircraft.

Moreover and advantageously, the said aircraft additionally comprises:
- display means; and/or
- control means making it possible for an operator to command an additional parachuting sequence; and/or
- control means making it possible for an operator to command a cancellation of at least one parachuting sequence; and/or
- actuating means making it possible for an operator to cancel any action by or preceding command given by that operator.

BRIEF DESCRIPTION OF THE DRAWINGS

The figures of the appended drawing will give a good understanding of how the invention may be embodied. In these figures, identical references refer to similar elements.

DETAILED DESCRIPTION OF THE INVENTION

Figure 1:
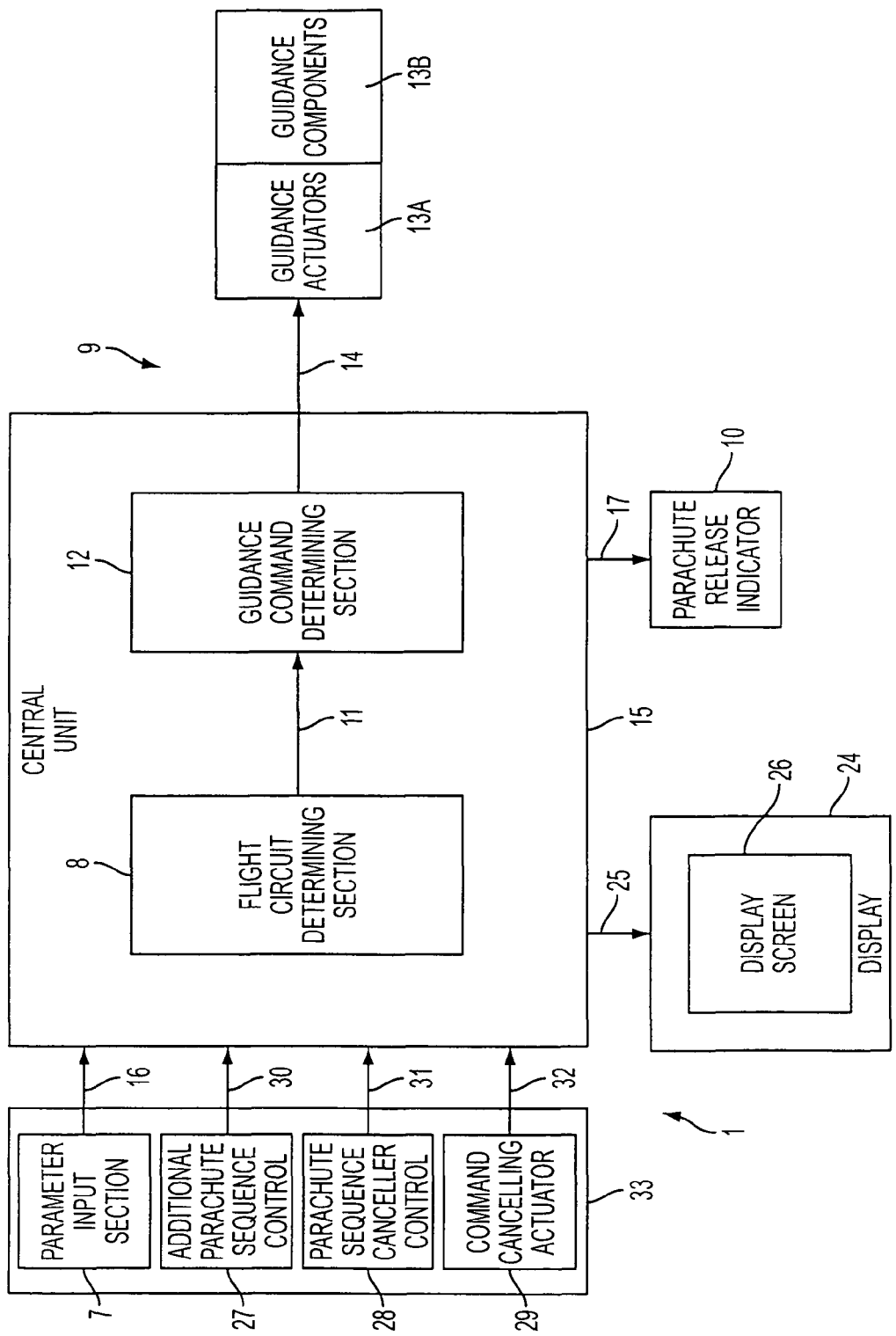
FIG. 1 is the block diagram of a device according to the invention.
Figure 2:
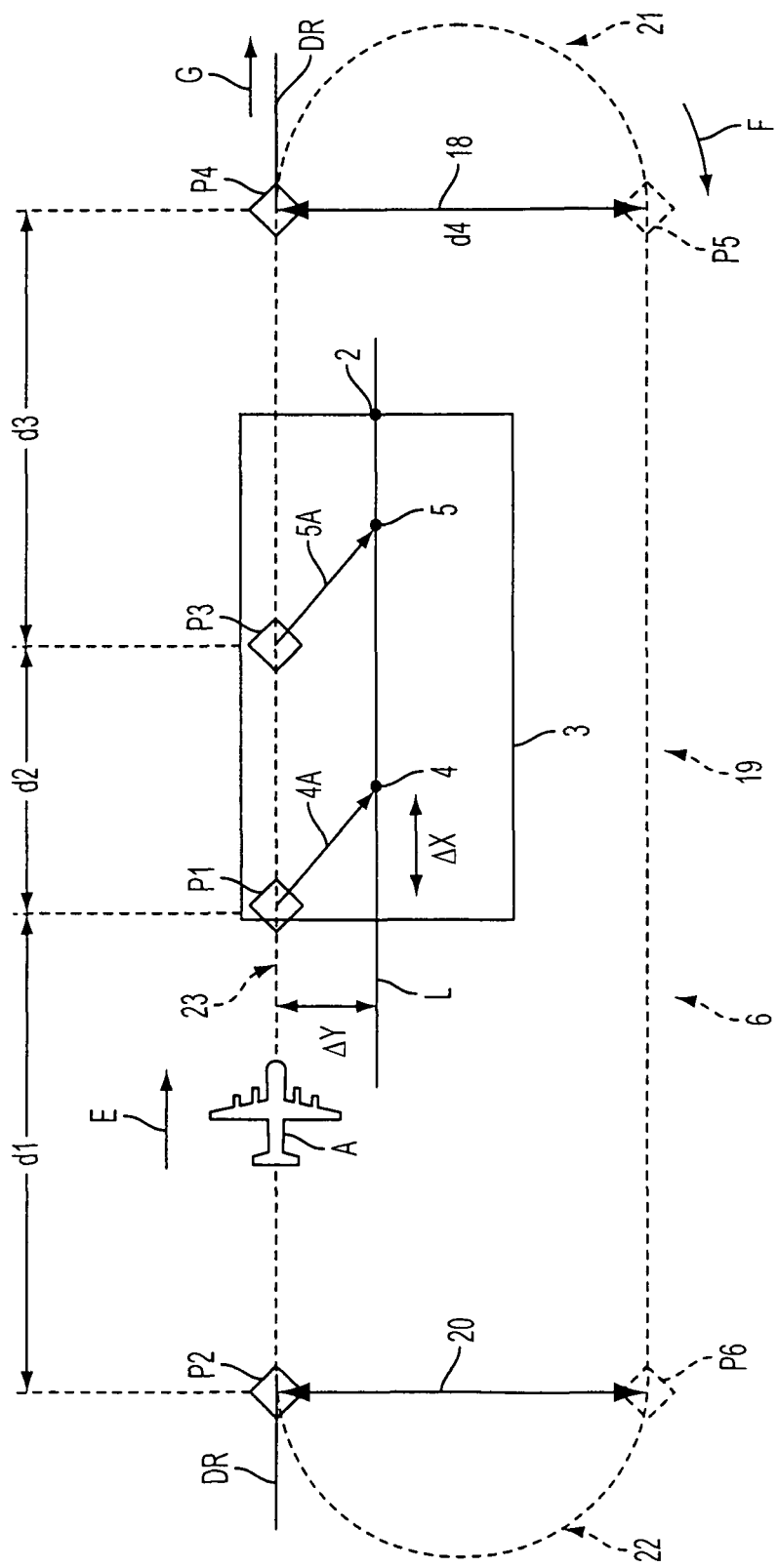
FIG. 2 is a diagram illustrating the flight of an aircraft for the purpose of a parachuting, according to the invention.

The device 1 according to the invention and shown diagrammatically in FIG. 1 is intended to assist a pilot of an aircraft A, in particular a military transport aircraft, during the parachuting from the said aircraft of items, in particular of troops and/or equipment, which must be parachuted onto a reception area 3 on the ground, as shown diagrammatically in FIG. 2.

In the usual way, in order to carry out a parachuting, there is determined:
- a release point P1 where the items to be parachuted must be released from the said aircraft A. The said release point P1 is determined such that the items that are parachuted starting from the latter, as illustrated by an arrow 4A, touch the ground at a predetermined reception point 4 which is of course located on the said reception area 3 on the ground. In addition to a vertical difference (the point 4 being on the ground and the point P1 being at the flight altitude of the aircraft A), the said point P1 has a longitudinal difference $\Delta X$ and a lateral difference $\Delta Y$ with respect to the said point 4. These differences $\Delta X$ and $\Delta Y$ depend on a plurality of parameters such as the force and direction of the wind, the type of parachute used or the position, inside the aircraft A, of the load to be parachuted;
- an alignment point P2 which forms, with the said release point P1, a straight reference line DR which is parallel with a center line L provided on the reception area 3. Preferably, the said reception area 3 is rectangular and the center line L is the longitudinal axis of symmetry of that rectangular area 3, the reception point 4 being located on that center line L. The said alignment point P2 is located at a predetermined distance d1 from the said release point P1, upstream of the latter in the direction E of flight of the aircraft A;
- an end point P3 which is located on the said straight reference line DR downstream of the said release point P1 at a distance d2 from the latter, at a point where the release of the items to be parachuted must stop in order to prevent them from overshooting the said reception area 3 and therefore an end point 2 located on the center line L. In the example shown, a parachuting from the point P3 in principle reaches the ground at a point 5, as illustrated by an arrow 5A. The distance between the said points 2 and 5 serves as a safety margin; and
- an end point P4 which is located on the said straight reference line DR downstream of the said end point P3 at a distance d3 from the latter, at a point where a parachuting sequence ends.

Also, in order to carry out a parachuting sequence:
- the aircraft A is guided along the said straight reference line DR; and
- during this guidance, the release of at least some of the said items to be parachuted is carried out, and this is done uniquely between the said release point P1 and the said end point P3.

According to the invention, in order to be able to carry out additional parachutings, in particular in the case where a single pass over the reception area 3 is insufficient:
- a flight circuit 6 is determined, allowing the aircraft A to return, from the said end point P4 to the said alignment point P2 and then to again follow the said straight reference line DR until it reaches the said end point P4; and
- in order to carry out a number n of additional parachuting sequences, n being an integer greater than or equal to 1:
  - the aircraft A is guided automatically in such a way that it flies n times around the said flight circuit 6; and
  - during this guidance, each time the aircraft A passes between the said release point P1 and the said end point P3 along the said straight reference line DR, the release of items to be parachuted is carried out.

In order to do this, the said device 1 comprises:
- means 7 making it possible for an operator to enter parameters described below;
- means 8 for automatically determining, with the help of the said parameters, the said flight circuit 6;
- means 9 for automatically making the said aircraft A follow the said flight circuit 6 at least once, for the purpose of a parachuting sequence; and
- means 10 for indicating the possibility of releasing items to be parachuted, when the aircraft A is on the straight reference line DR of the said flight circuit 6, between the said points P1 and P3. The said means 10 can in particular comprise luminous means which are provided in the hold and which give authorization for the dispatcher to carry out the release of the troops or of the equipment to be parachuted.

The said means 9, which are connected by a link 11 to the means 8, comprise:

usual means 12 for determining guidance commands making it possible for the said aircraft A to follow the said flight circuit 6; and usual means 13A, in particular actuators that are connected to means 12 by a link 14, for applying the said guidance commands to usual guidance means 13B, such as control surfaces (rudder, elevator, etc.) of the said aircraft A.

The said means 8 and 12 can be grouped into a central unit 15 which is connected by links 16 and 17 to the said means 7 and 10.

It will be noted that, according to the invention, the straight reference line DR and the points P1, P2, P3 and P4 located on that straight reference line DR are updated, preferably before each new parachuting, according to the characteristics of that new parachuting.

According to the invention, in order to determine the said flight circuit 6, the said means 8 determine:

an auxiliary point P5 which is located in a horizontal pane containing the said straight reference line DR, at a distance d4 from the said end point P4, the segment of straight line 18 (of length d4) formed by the said auxiliary point P5 and the said end point P4 being perpendicular to the said straight reference line DR; and an auxiliary point P6 which is also located in the said horizontal plane and which is such that the segment of straight line 19 formed by the said auxiliary points P5 and P6 is parallel with the said straight reference line DR and perpendicular to the segment of straight line 20 (also of length d4) formed by the said auxiliary point P6 and the said alignment point P2.

The said flight circuit 6 is therefore defined as a circuit that is able to be followed by the aircraft A in the said horizontal plane and which passes successively (as illustrated by an arrow F in FIG. 2) through the said end point P4, the said auxiliary point P5, the said auxiliary point P6 and the said alignment point P2, before rejoining the said end point P4.

This flight circuit 6 therefore comprises:

an arc of circle 21 able to be followed by the aircraft A between the points P4 and P5;

the said segment of straight line 19 between the said points P5 and P6;

an arc of circle 22 able to be followed by the aircraft A between the points P6 and P2; and a segment of straight line 23 between the points P2 and P4, forming part of the said straight reference line DR.

In order to do this, the said means 7 make it possible for an operator to enter the said distance d4 into the central unit 15, together with the direction of turn F (to the right or to the left) for the flight of the aircraft A after the said end point P4.

In a particular embodiment, the means 8 are formed in order to choose a direction of turn by default in the case where this information is not entered using the means 7. Preferably, the said means 8 then choose, as a direction of turn, that which makes it possible to keep the parachuting area to the left of the aircraft A when the latter will fly the segment of straight line 19 such that the pilot can always have that area in sight.

The means 7 of course also make it possible for an operator to enter information such as the distances d1, d2 and d3 for example, which are necessary for the said means 8 in order to determine the said points P1, P2, P3 and P4 as described above.

Moreover, the said device 1 additionally comprises:

display means 24 that are connected by a link 25 to the central unit 15 and that are able to display, on a display screen 26, information relating to the parachuting;

control means 27 making it possible for an operator to command an additional parachuting sequence;

control means 28 making it possible for an operator to command a cancellation of at least one parachuting sequence; and actuating means 29 making it possible for an operator to cancel any preceding command or action, particularly in the case of error.

The said means 27 to 29 are connected by links 30 to 32 to the central unit 15.

Moreover, the said means 7 and 27 to 29 can be grouped into one and the same interface unit 33, in particular a keyboard and/or a computer mouse, which is for example able to cooperate with the said display screen 26.

Thus, by means of the device 1 according to the invention:

A/ at the time of the preparation of the mission, the crew can define the total number of parachuting sequences, using the means 7. When more than one parachuting sequence is foreseen such that the aircraft A must follow the flight circuit 6 at least once, the points P5 and P6 can be entered in the flight plan. Thus, the aircraft A will be able to follow the said flight circuit 6 automatically;

B/ during the flight, before reaching the said end point P4, the crew can modify at any time the number of parachuting sequences foreseen, using the control means 27 and 28. In fact, using the said control means 27, it can command at least one additional parachuting sequence and, using the said control means 28, it can command the cancellation of at least one previously foreseen parachuting sequence; and C/ when the parachuting sequences have been completed, the aircraft A continues its flight according to the flight plan, after the point P4, in the direction illustrated by the arrow G in FIG. 2.

Thus, by means of the invention, when more than one parachuting sequence is foreseen before the arrival at the point P4, the crew can:

follow the planned mission. No action has then to be carried out. In fact, in this case, starting from the point P4, the aircraft A rejoins the point P5 and flies along the flight circuit 6 as many times as planned; or command a new parachuting sequence, if necessary, using the control means 27; or command an exit from the parachuting phase, using the control means 28, and continue the flight plan.

Moreover, when a single parachuting sequence is foreseen (which is carried out during a first pass of the aircraft between the points P1 and P3), the crew can:

follow the planned mission. No actions then has to be carried out. After the point P4, the aircraft follows the flight plan, as illustrated by the arrow G; or before reaching the point P4, command, if necessary, a new parachuting sequence, using the control means 27.

The invention claimed is:

1. A method of parachuting items from an aircraft to a ground reception area, the method comprising:

determining a release point where the items to be parachuted must be released from the aircraft, the release point depending on a predetermined reception point located on the ground reception area;

determining an alignment point that forms with the release point a straight reference line that is parallel with a center line provided on the reception area, the alignment point being located at a predetermined distance from the release point, upstream of the latter in the direction of flight of the aircraft;

determining a first end point that is located on the straight reference line downstream of the release point where the release of the items to be parachuted must stop so as to prevent them from overshooting the reception area; and determining a second end point that is located on the straight reference line downstream of the first end point where a parachuting sequence is ended;

performing a first parachuting sequence by:
  guiding the aircraft along the straight reference line; and
  releasing, during the guidance, some of the items to be parachuted between the release point and the first end point, determining a flight circuit for the aircraft to return from the second end point to the alignment point and then to follow the straight reference line until it reaches the second end point, wherein the flight circuit is determined by:
  determining a first auxiliary point that is located in a horizontal plane containing the straight reference line at a particular distance from the second end point, the segment of a straight line containing the first auxiliary point and the second end point being perpendicular to the straight reference line,
  determining a second auxiliary point that is located in the horizontal plane, the segment of a straight line formed by the first and second auxiliary points being parallel with the straight reference line and perpendicular to the segment of a straight line formed by the second auxiliary point and the alignment point, and
  determining the flight circuit as a circuit that the aircraft may follow in the horizontal plane and that passes successively through the second end point, the first auxiliary point, the second auxiliary point, and the alignment point before rejoining the second end point again by following the straight reference line;

performing a number n of additional parachuting sequences, n being an integer greater than or equal to 1, by:
  automatically guiding the aircraft to complete the flight circuit n times,
  releasing, during the automatic guidance, items to be parachuted each time the aircraft passes between the release point and the first end point along the straight reference line, and
  updating, before each parachute release, the straight reference line and the points located thereon according to characteristics of the next parachute release;

establishing the total number of parachuting sequences at a time of preparing for a parachuting mission;

providing, during each parachuting sequence, an operator an opportunity to modify, before reaching the second end point of the current parachuting sequence, the number of parachuting sequences so as to command an additional parachuting sequence or command an exit from the parachuting sequences and continue a flight plan; and continuing the flight plan, after the second end point has been reached and the parachuting sequences have been completed, wherein:

a longitudinal difference and a lateral difference between the release point and the reception point depend on the position of the load to be parachuted inside the aircraft.

2. The method of claim 1, further comprising:
determining a number p of parachuting sequences before the flight of the aircraft, p being an integer greater than or equal to 1; and
automatically controlling the flight of the aircraft to carry out the first parachuting sequence and a number p−1 of additional parachuting sequences.

3. The method of claim 1, further comprising commanding, during the flight, an additional parachuting sequence before arriving at the second end point.

4. A method of parachuting items from an aircraft to a ground reception area, the method comprising:
determining a release point where the items to be parachuted must be released from the aircraft, the release point depending on a predetermined reception point located on the ground reception area;

determining an alignment point that forms with the release point a straight reference line that is parallel with a center line provided on the reception area, the alignment point being located at a predetermined distance from the release point, upstream of the latter in the direction of flight of the aircraft;

determining a first end point that is located on the straight reference line downstream of the release point where the release of the items to be parachuted must stop so as to prevent them from overshooting the reception area; and determining a second end point that is located on the straight reference line downstream of the first end point where a parachuting sequence is ended;

performing a first parachuting sequence by:
  guiding the aircraft along the straight reference line; and
  releasing, during the guidance, some of the items to be parachuted between the release point and the first end point, determining a flight circuit for the aircraft to return from the second end point to the alignment point and then to follow the straight reference line until it reaches the second end point, wherein the flight circuit is determined by:
  determining a first auxiliary point that is located in a horizontal plane containing the straight reference line at a particular distance from the second end point, the segment of a straight line containing the first auxiliary point and the second end point being perpendicular to the straight reference line,
  determining a second auxiliary point that is located in the horizontal plane, the segment of a straight line formed by the first and second auxiliary points being parallel with the straight reference line and perpendicular to the segment of a straight line formed by the second auxiliary point and the alignment point, and
  determining the flight circuit as a circuit that the aircraft may follow in the horizontal plane and that passes successively through the second end point, the first auxiliary point, the second auxiliary point, and the alignment point before rejoining the second end point again by following the straight reference line;

performing a number n of additional parachuting sequences, n being an integer greater than or equal to 1, by:
  automatically guiding the aircraft to complete the flight circuit n times,
  releasing, during the automatic guidance, items to be parachuted each time the aircraft passes between the release point and the first end point along the straight reference line, and
  updating, before each parachute release, the straight reference line and the points located thereon according to characteristics of the next parachute release;

establishing the total number of parachuting sequences at a time of preparing for a parachuting mission;

providing, during each parachuting sequence, an operator an opportunity to modify, before reaching the second end point of the current parachuting sequence, the number of parachuting sequences so as to command an additional parachuting sequence or command an exit from the parachuting sequences and continue a flight plan; and continuing the flight plan, after the second end point has been reached and the parachuting sequences have been completed, wherein:

the first auxiliary point is determined using the modifiable parameters of the particular distance and the direction of turn of the aircraft after the second end point, and a longitudinal difference and a lateral difference between the release point and the reception point depend on the position of the load to be parachuted inside the aircraft.

5. The method of claim 4, further comprising:

determining a number p of parachuting sequences before the flight of the aircraft, p being an integer greater than or equal to 1; and automatically controlling the flight of the aircraft to carry out the first parachuting sequence and a number p−1 of additional parachuting sequences.

6. The method of claim 4, further comprising commanding, during the flight, an additional parachuting sequence before arriving at the second end point.

* * * * *